United States Patent
Caironi et al.

(10) Patent No.: US 12,061,607 B2
(45) Date of Patent: Aug. 13, 2024

(54) METHOD AND SYSTEM FOR HIGH-THROUGHPUT DISTRIBUTED COMPUTING OF COMPUTATIONAL JOBS

(71) Applicant: ByteNite Inc., San Francisco, CA (US)

(72) Inventors: Fabio Caironi, San Francisco, CA (US); Niccolò Castelli, San Francisco, CA (US)

(73) Assignee: ByteNite Inc., San Francisco, CA (US)

( * ) Notice: Subject to any disclaimer, the term of this patent is extended or adjusted under 35 U.S.C. 154(b) by 0 days.

(21) Appl. No.: 17/988,066

(22) Filed: Nov. 16, 2022

(65) Prior Publication Data

US 2023/0153305 A1 May 18, 2023

Related U.S. Application Data

(60) Provisional application No. 63/280,190, filed on Nov. 17, 2021.

(51) Int. Cl.
*G06F 16/2455* (2019.01)
*G06F 16/182* (2019.01)

(52) U.S. Cl.
CPC ........ *G06F 16/2455* (2019.01); *G06F 16/182* (2019.01)

(58) Field of Classification Search
CPC ............................ G06F 16/2455; G06F 16/182
See application file for complete search history.

(56) References Cited

U.S. PATENT DOCUMENTS

| | | | |
|---|---|---|---|
| 9,621,606 B2* | 4/2017 | Swenson | H04N 19/40 |
| 2006/0149652 A1* | 7/2006 | Fellenstein | G06Q 40/00 705/35 |
| 2018/0054062 A1* | 2/2018 | Roessler | G05B 15/02 |

* cited by examiner

*Primary Examiner* — Cam Y T Truong
(74) *Attorney, Agent, or Firm* — Mark Bandy; Rankin Hill & Clark, LLP

(57) ABSTRACT

A method and a system for high-throughput distributed computing of computational jobs, comprise setting up a data storage system and a grid of user devices that offer computational capacity. Customer entities upload in a customer platform first job specification parameters, and then the full job data. A partitioning scheme is selected based on the job specification and on the grid status, that is periodically updated by querying the user devices. Based on the partitioning scheme, the job data are split on the fly in input chunks, that are included in executable tasks and assigned to different user devices. To this end, devices may be selected based on computing capacity and availability parameters, and on a priority level selected for the job. Output chunks are generated by executing the tasks, and after verification of timely arrival of all the required output chunks, they are assembled as a complete job result, for download by the customer.

10 Claims, 4 Drawing Sheets

METHOD AND SYSTEM FOR HIGH-THROUGHPUT DISTRIBUTED COMPUTING OF COMPUTATIONAL JOBS

FIELD OF THE INVENTION

The present invention relates to the field of distributed computing of computational jobs.

BACKGROUND OF THE INVENTION

In the era of IoT and Big Data, distributed file systems and cloud computing are fundamentals for data management and processing. Worldwide cloud servers owned by the biggest tech companies are the most precious resource we can rely on today for performing outsourced distributed computations; edge computing has become indispensable as the volume of data managed by businesses for any purpose is increasingly big.

Year and years of technological advancement have paved the way to cloud computing towards Industry 4.0, making it possible for a wide range of cloud solutions to become reality and changing the way we look at things irreversibly. As a consequence, many new businesses that operate in and thanks to the cloud sector arose in the past fifteen years such as Snowflake, Cloudflare, Databricks, and well-known tech industry leaders Google, Microsoft, Amazon, IBM could have become IT giants also thanks to the introduction of the cloud.

Cloud computing empowers massive workloads to be processed efficiently and flexibly through one or multiple outsourced servers. In particular, the distributed computing field studies the coordination of networked computing units placed in different locations, which can jointly perform disparate computing tasks. Finally, the grid computing paradigm extends the distributed computing concept by allowing for a heterogeneity in the composition of the networked computers and considering an original, massive computing job to be broke down into single tasks, which are distributed over the network.

Some projects exist today that aim at distributing computational jobs over a grid of common devices, especially desktop ones, in a grid computing framework. They aim at making use of a considerable underlying widespread computational power that is inside common user's devices. This power is usually unexploited during the inactivity of their human owners, for instance during the night.

Deploying distributed computations on existing and commonly active devices is not only an implementation of the grid computing paradigm, but also a green alternative to building cloud computing infrastructures like data centers, inasmuch it guarantees highly-parallelized and low-intensive computations and realizes heat dispersion, thus without the need to use additional cooling other than that provided by the environment.

Many well-known operating solutions belong to the category of Volunteer Computing, where users make their devices available for hosting external intensive computations on a voluntary basis. Examples of distributed computing projects are BOINC, Distributed.net, HTCondor and Folding@Home.

BOINC is a platform for distributed high throughput computing where worker nodes are desktop and laptop computers, tablets and smartphones volunteered by their owners. A great number of projects are linked to BOINC and use its distributed infrastructure. For example: SETI@Home for the digital signal processing of radio telescope data; Einstein@Home for the search of weak astrophysical signals from spinning neutron stars; IBM World Community Grid for scientific research on topics related to health, poverty and sustainability; Climateprediction.net for climate models simulations.

HTCondor is another open-source distributed computing software enabling the increase of computing throughput, developed at University of Wisconsin-Madison.

HTCondor provides a job queueing mechanism, scheduling policy, priority scheme, resource monitoring, and resource management and can integrate both dedicated resources (rackmounted clusters) and non-dedicated desktop machines (thanks to volunteer computing) into one computing environment.

SUMMARY OF THE INVENTION

One object of the present invention is to realize a new high-throughput distributed computing environment, adapted to receive and solve different computational jobs.

Another object of the invention is providing a sustainable alternative to the increasing resource consumption by cloud computing.

Still another object of the invention is spreading distributed computing over a high number of user devices, such as personal computers, smartphones, tablets, gaming consoles and smart TVs, while maintaining a high level of efficiency.

These and other objects are achieved by a method and a system for distributed computing of computational jobs according to any one of the appended claims.

The invention provides a customer platform where a customer entity may upload job specifications and then the related computational job, to be executed by a grid of user devices. A software internal service system queries the user devices to estimate a state of the grid. Then, based on the job specifications and on the state of the grid, it selects a job partitioning scheme.

The input stream of job data that is uploaded, and is split in input chunks of data, according to splitting parameters of the partitioning scheme. The input chunks are included in executable task files that are distributed to the user devices based on distribution parameters of the splitting scheme. As the state of the grid is taken into account while setting the partitioning scheme, each device will receive an appropriate task for which a predetermined execution and sending time can be expected.

Preferably, the splitting and distributing steps already take place during upload of the input stream. Thus, the full job data needs not be stably saved in the databases supporting the internal service system, but just the input chunks can be temporarily saved, and part of them can be deleted even before uploading is completed.

The user devices receive and execute the input chunks, and obtain output chunks that are sent back to the internal service system. Advantageous embodiments provide arrangements to compensate for missing or unusable reply from one or more user devices, both by preventively duplicating tasks for execution by distinct devices, and by successively assigning the uncompleted tasks to other computing devices.

Finally, the output chunks are assembled in a job result, which can be accessed by the customer from the platform.

Therefore, the invention achieves efficiency and reliability for distributed computing, with small risks of delayed delivery of the job result. The job specifications for different jobs allow to prioritize computing of certain jobs, with the appropriate distribution of tasks to higher or lower performing user devices.

Users that offer their computing capacity may be rewarded with credits or discounts, to increase participation. Since computing is not concentrated in central servers, heat dissipation is considerably increased, given that each user device is naturally cooled by the environment. Thus, the need of cumbersome cooling systems is removed, enabling great improvements from economic and environmental sustainability points of view.

BRIEF DESCRIPTION OF THE DRAWINGS

The present invention will now be described in more detail hereinafter with reference to the accompanying drawings, in which embodiments of the invention are shown.

DETAILED DESCRIPTION

Figure 1:
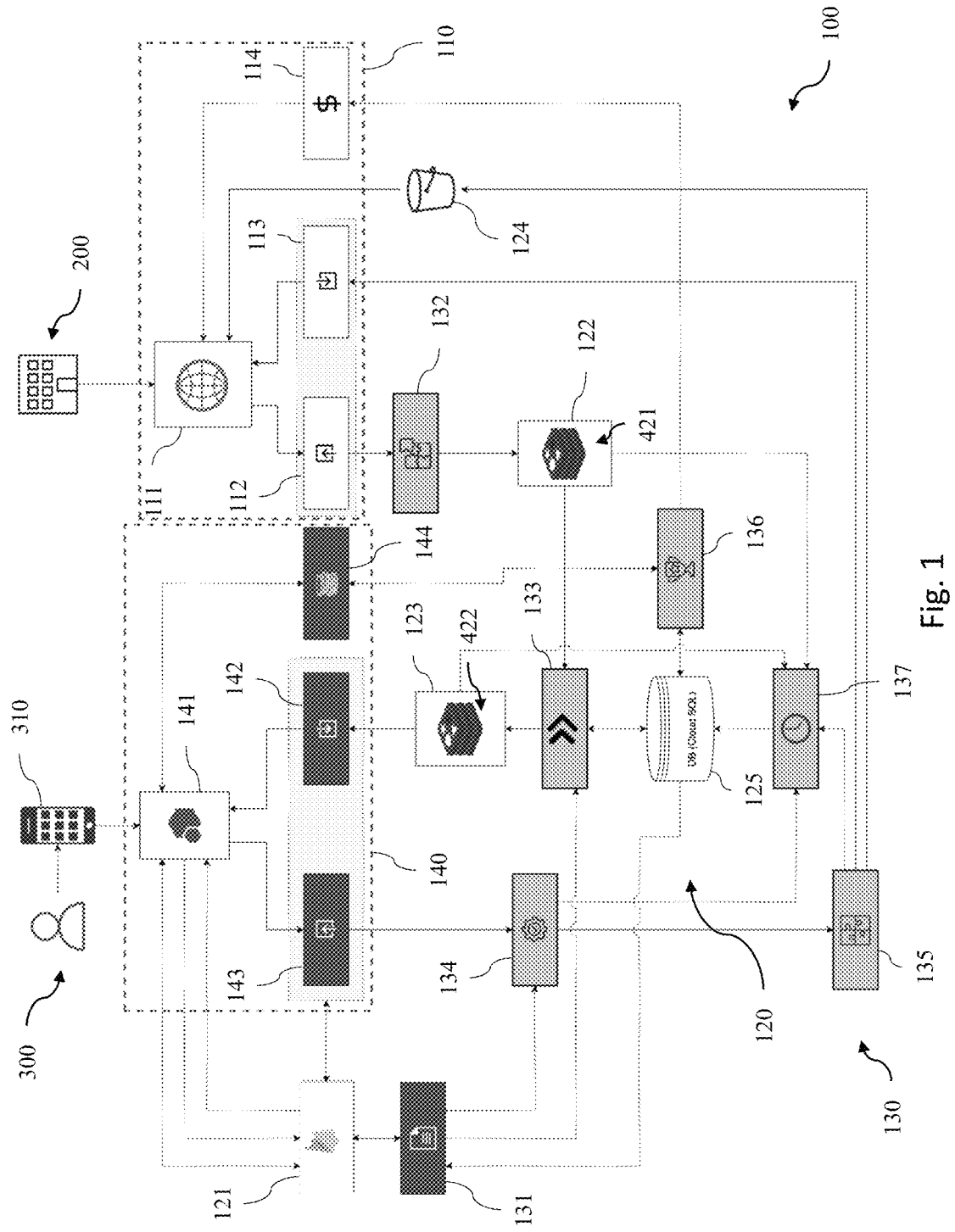
FIG. 1 is a schematic diagram of a system for distributed computing of computational jobs according to one embodiment of the invention.
Figure 2:
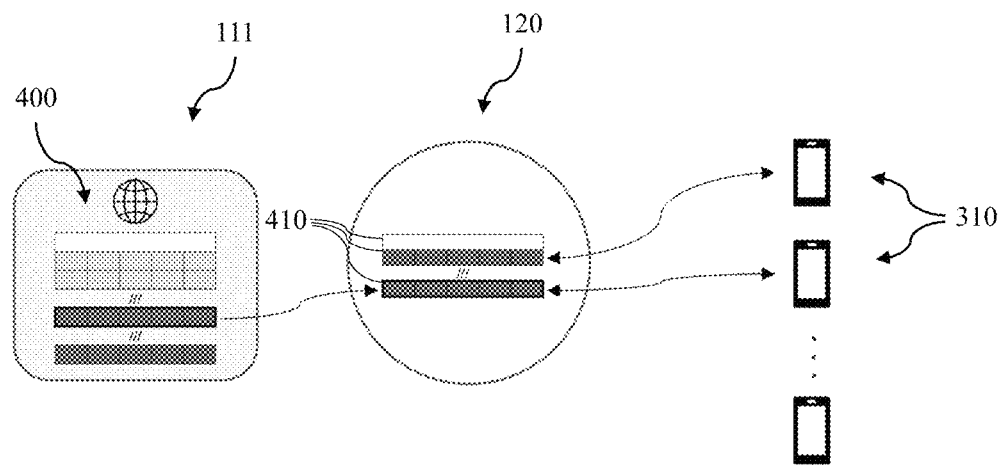
FIGS. 2 and 3 are schematic representations of different steps of processes for splitting job data in input chunks, distributing tasks to user devices, receiving output chunks, and assembling as a job result, of a method for distributed computing of computational jobs according to one embodiment of the invention.

A method for distributed computing of computational jobs, and an electronic system 100 configured to perform the method, are described.

The system 100 comprises a customer-side software 110, that is provided to customer entities 200. Customer entities 200 are subjects that are interested to have one or more computational jobs 400 computed by the system 100, to obtain respective job results 500.

The customer-side software 110 includes an informatic customer platform 111 for uploading computational jobs 400 by the customer entities 200, and for other functions that are specified below. In more detail, the customer-side software 110 includes a plurality of software customer services 112, 113, 114 configured to perform individual functions related to the platform.

Each computational job 400 is composed of job data with a certain job dimension. The job data can be inputted in the customer platform 111 in the form of an input stream of data. For this purpose, the customer-side software 110 includes a job uploading service 112.

Commonly, customer entities 200 provide computational jobs 400 with relatively high job dimensions, and accordingly receiving each input stream takes a non-negligible upload time interval.

For reasons that will be clear from the following, uploading the input stream is preceded by inputting in the customer platform 111 job specifications, still by the customer entities 200, the job specifications being uploaded by the job uploading service 112. The job specification of a certain computational job 400 includes parameters characterizing the respective computational job 400. Preferred examples of such parameters are job size, job input and/or output format, programming language, execution by library algorithms or custom algorithms, object of the job (such as media operations, tabular data processing, text operations or web testing), execution priority level, and geographical restrictions in execution location.

The system 100 also comprises a data storage system 120, comprising one or more databases 121, 122, 123, 124, 125, in the same or different locations, some of them being cloud databases in some embodiments. The data storage system 120 is managed by the electronic system owner, and is not intended to be accessed by the customer entities 200 or by user entities 300, as described below. The job uploading service 112 is configured to upload the input stream and the job specifications in the data storage system 120.

A software internal service system 130 is executed in the one or more databases 121, 122, 123, 124, 125 of the data storage system 120, to receive and manage the job data received through the customer platform 111, and to perform other functions explained below. The internal service system 130 may comprise plural internal services 131, 132, 133, 134, 135, 136, 137 with algorithms that perform different functions, among the functions that will be described below.

The system 100 comprises a user-side software 140, that is provided to user entities 300. User entities 300 are subjects that own respective user devices 310, adapted for installation and execution of the user-side software 140, and that are interested in offering computational power. Exemplary user devices 310 include personal computers, smartphones, tablets, gaming consoles and smart TVs. Preferably, the computational power is offered in change for money, services or other credits according to a predetermined pricing scheme.

The user-side software 140 may comprise a device application 141 and plural user services 142, 143, 144, with algorithms that perform different functions, among the functions that will be described below. The device application 141 is configured to provide a user graphic interface, and to activate the user services 142, 143, 144, whenever needed.

The user devices 310 are remote from the storage system 120. When the user devices 310 execute the user-side software 140, they are at least periodically in signal communication with the storage system 120. Thus, the user devices 310 collectively form a grid in signal communication with the storage system 120. The grid is set up by progressive joining user devices 310.

The internal service system 130 is configured to periodically query and receive answers from the user devices 310. In particular, these functions are performed by a grid-management database 121 of the storage system 120, preferably a Firebase database, where answers from the user devices 310 are then stored.

In more detail, the user devices 310 are queried about a respective device status. The device status can be expressed in terms of parameters such as computing capacity parameters, characterizing the full potential performances of the user device 310, and availability parameters, characterizing the current and/or historical limits that prevent use of the full potential performances.

Examples of computing capacity parameters are values of installed RAM, CPU and storage. Availability parameters include power state of the user device 310 (power on/off), values of RAM, CPU, storage and bandwidth that are currently available, as they are not otherwise in use by the user device 310. Other availability parameters include values of usage threshold for RAM, CPU, storage, bandwidth and time thresholds. The usage threshold values can be set by the user entities 300 in order for the computing capacity used by the user-side software not to cover their whole available computing capacity. Time thresholds are one or more availability time windows that can be set by the user entity 300, possibly with different usage threshold values for different availability time windows.

Other examples of availability parameters are remaining battery, core temperature, current activity of the user device 310, user device 310 location, and accelerometer data.

Other availability parameters relate to the communication efficiency, or on the other side to the limitations in use of computing capacity caused by inefficient communication, such as network type, network speed, network latency, and IP address.

Still a further parameter is related to historical data about actual computing performances of the user devices 310. The performances are evaluated based on execution of tasks, that are bundles of executable files and data chunks. As described below, the user devices 310 are assigned tasks, generated from input data chunks, in order to obtain pieces of the job results 500. The tasks that are distributed to different user devices 310 will be generally different. So, in one embodiment the historical data include the performance of the user device 310 on one or more such recent tasks, for example being represented by an execution time and execution completion.

In other embodiments, the performances are evaluated based on execution of one or more recent predetermined test tasks. The test task can be sent from the storage system 120 to the user device 310 with the status query, with no function in obtaining the job result 500, but just for the sake of testing the computing capacity and availability of the user device 310, as well as its computing accuracy. The test task can be the same for all the user devices 310, so that their performance testing will be comparable.

The user-side software 140 is configured to receive the status queries from the storage system 120, that is interpreted by the user-side software 140 as a request for a status answer, to assess at least some of the computing capacity and availability parameters of the user device 310, and to generate and send a status answer including the assessed computing capacity and availability parameters.

In the preferred embodiments, status queries include first, more frequent, status queries, and second, less frequent, status queries. The first status queries are also named heartbeat queries, requiring from the user device 310 an answer only including availability parameters, such as RAM and CPU usage, and network speed. The second status queries may include requests for some or all of the parameters described above, being more parameters than those required for the heartbeat query.

Assessing the computing capacity and availability may include executing the test task, to obtain a test output chunk of data. This allows the internal system to check a test execution and delivery time of the test task, and an integrity or correctness of the test output chunk, that is correspondence of the test output chunk with a predetermined result chunk expected for the test task.

The storage system 120 in principle should receive the status answers from all the queried user devices 310. However, in real applications, status answers are successfully received only from some of the queried user devices 310. In fact, status answers may be missing from power-off user devices 310, from offline user devices 310, and for user devices 310 that fail for whatever reason to receive the status query, to assess the device status, or to send the status answer.

The internal service system 130 includes a grid management service 131, that is configured to define a grid status as a function of at least the received status answers that are stored in the grid-management database 121, preferably as a function of the received status answers, answer times of the received status answers, any missing status answer, and integrity of any test output chunk. Thus, it is worthwhile noting that some of the computing capacity and availability parameters may not be determined by the user-side software 140, but by the internal service system 130, based on the received/missing status answers, on the answer times, and on the test output chunk integrity.

Preferably, defining the grid status comprises processing at least some of the computing capacity and availability parameters of each device status to obtain for each user device 310 one or more device scores 150. Then, defining the grid status comprises ordering the user devices in one or more grid indexes 160 based on respective device scores 150. Distinct device scores 150 may be based on distinct groups of computing capacity and availability parameters.

A first preferred device score 150 is a computing capacity score. The capacity score can be an increasing function of RAM, CPU and storage available values, and a decreasing function of connection instability, low battery, high core temperature and intensive device activity.

A second preferred device score 150 is a fault rate score. The fault rate score can be a function of the historical fault data of the user devices 310. The historical fault data may include past events of failure to return a task, delay in returning a task, and returning corrupted or incorrect results for a task.

A third preferred device score 150 is a balancing score, giving statistically higher scores to historically less used user devices 310. The balancing score can be given for example by multiplying a randomly generated number with the time interval from the last assignment of a task to the user device.

A fourth preferred score 150 is an overall score, being a combination of two or more, preferably all, of the other device scores 150, including the three ones described above and any other additional device score 150 that could be envisaged by a skilled person. Preferably, the overall score is an increasing function of the capacity and balancing scores, and a decreasing function of the fault rate score.

As the user devices 310 are periodically queried about their status, the device scores 150 and the grid indexes 160 are periodically updated and may vary from query to query. Frequent updates are useful to avoid problems such as a user device 310 being offline when it is registered in the grid status as online, and so to prevent assignment of tasks to unavailable user devices 310.

According to an aspect of the invention, the internal service system is configured to select for each computational job 400 a respective job partitioning scheme, which is preferably different for different computational jobs 400. The job partitioning scheme includes parameters at least for splitting the job data and distributing it to the user devices 310.

The job partitioning scheme, as well as its parameters, are computed as a function of the grid status and of the job specification. Thus, different grid statuses and different job specifications will generally result in different partitioning schemes.

It is worthwhile noting that the job specification is sufficient for this purpose even without the full job data being available. Thus, as the job specification is inputted before the job data, the partitioning scheme can be selected by the internal service system 130 before the start of the upload time interval or during the upload time interval, without waiting that the full input stream of job data is completed.

Then, the internal service system 130 is configured for splitting the job data included in each input stream in input chunks 410 of data, according to splitting parameters of the partitioning scheme selected for the computational job 400.

Preferably, the step of splitting is performed on the fly. In other words, it begins during the upload time interval. Moreover, each input chunk 410 is preferably only temporarily stored in the storage system 120. The input chunks 410 are stored on a queuing database 122 of the storage system 120 (namely, a first queuing database), that is preferably a Redis database. The queuing database 123 is configured for short-term storage to support frequent read and write operations.

The input chunks 410 can be used and deleted before the end of the upload time interval, that is before the complete job data has been uploaded through the customer platform 111. In more detail, each input chunk 410 is stored from a respective save instant to a respective delete instant. The save instant occurs during the upload time interval, as the save instant of the last input chunk 410 marks the end of the input stream uploading. For at least one input chunk 410, preferably most input chunks 410, depending on the job size, the delete instant occurs during the upload time interval too. So, usage of some input chunks 410, as described in the following, can be completed even before the full job data has been received.

Advantageously, the memory of the queuing database 122 may be never occupied by the full job data of a computational job 400, since it is partially deleted before complete receipt. Accordingly, storage space is saved.

The internal service system 130 is configured to generate one or more tasks 420 for each input chunk 410. As detailed below, the one or more tasks 420 for each input chunk 410 is only one task 420, or plural identical tasks 420. Each task 420 includes a respective input chunk 410, and an executable file including instructions to execute computations on the input chunk 410.

Then, the internal service system 130 is configured to assign and send each task 420 to one or more respective user devices 310, for execution of the task 420 by the user devices 310. It is worthwhile noting that some sub-steps of assignment may involve interaction of the internal service system 130 with the user devices 310.

Assignment of tasks 420 involves selecting the user devices 310 based on distribution parameters of the partitioning scheme of the respective computational job 400.

Preferred features of the job partitioning scheme are now described, for determining the splitting and distribution parameters, that are related to each other. The following steps, until otherwise indicated, are preferably performed by a partitioner service 132 of the internal service system 130.

In some embodiments, selecting the job partitioning scheme comprises discarding for the computational job 400 a number of user devices 310, and at least pre-electing for the computational job 400 the remaining user devices 310. From the following description it will be clear that in the preferred embodiments not all pre-elected devices 310 will necessarily be assigned a task 420.

In more detail, the distribution parameters of the partitioning scheme include one or more target ranges for respective computing capacity and availability parameters, or combinations thereof. For example, a target range can be applied to one or more device scores 150 and/or grid indexes 160, that are combinations of the computing capacity and availability parameters, so that assignment will be based on the device score 150 or on a device position in the grid index 160.

Thus, for the purpose of assigning the tasks 400 to the user devices 310, the job partitioning scheme provides that the internal service system 130 discards for the computational job 400 incompatible user devices 310 and at least pre-elects for the computational job 400 the remaining compatible user devices 310, depending if their device status has computing capacity and availability parameters (as such, or combined in device scores 150 and/or grid indexes 160) that are incompatible or compatible with the one or more target ranges. Any user device 310 from which a corrupted test output chunk was received may be automatically discarded as incompatible.

The target ranges are determined as a function of the job specifications, more preferably as a function of the execution priority level, that is a desired priority level selected by the customer for the job 400. Different priority levels may be selected while inputting the job specification, and may be available for different prices. Computational jobs 400 with higher priority levels will cause selection of a target range relatively high for the overall score or for the computational capacity score, while lower priority levels will cause selection of a relatively low such target range.

Additional target ranges for discarding or pre-electing user devices 310 can be determined as a function of geographical restrictions in execution location, which may be selected while inputting the job specification, for example because of national security restrictions which may arise for certain computational jobs.

Figure 4:
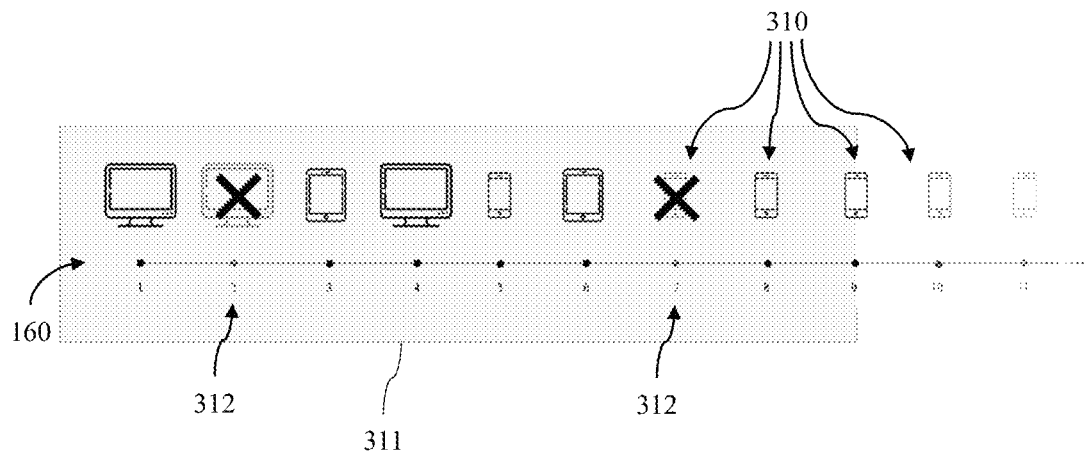
FIGS. 4 and 5 are schematic representations of pre-election and clustering steps for assigning tasks to user devices, according to the method of FIGS. 2 and 3.
Figure 5:
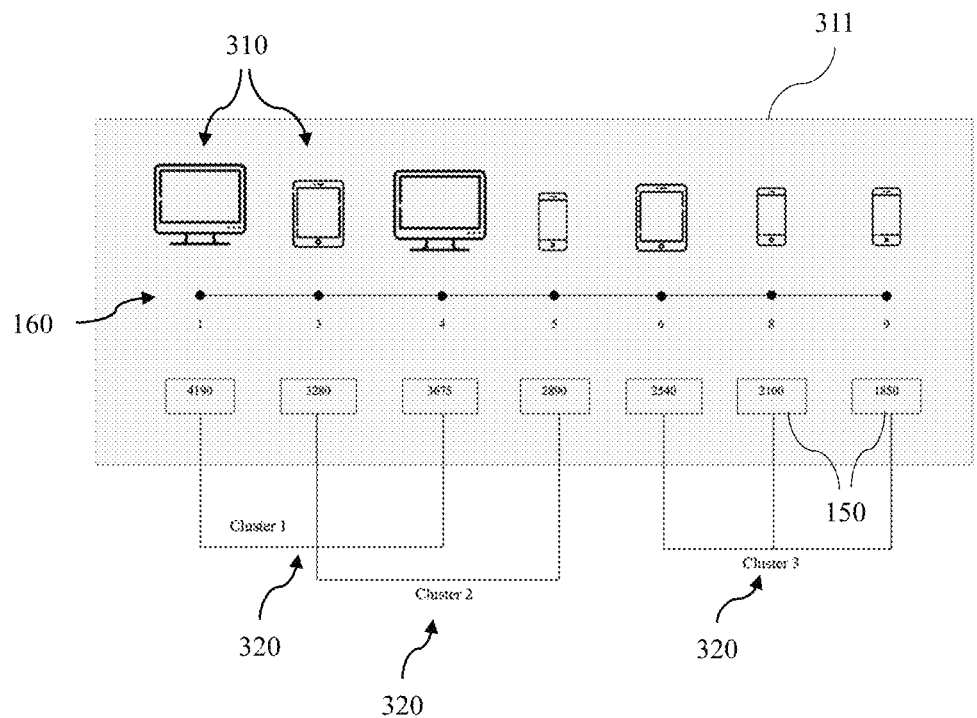
Figure 6:
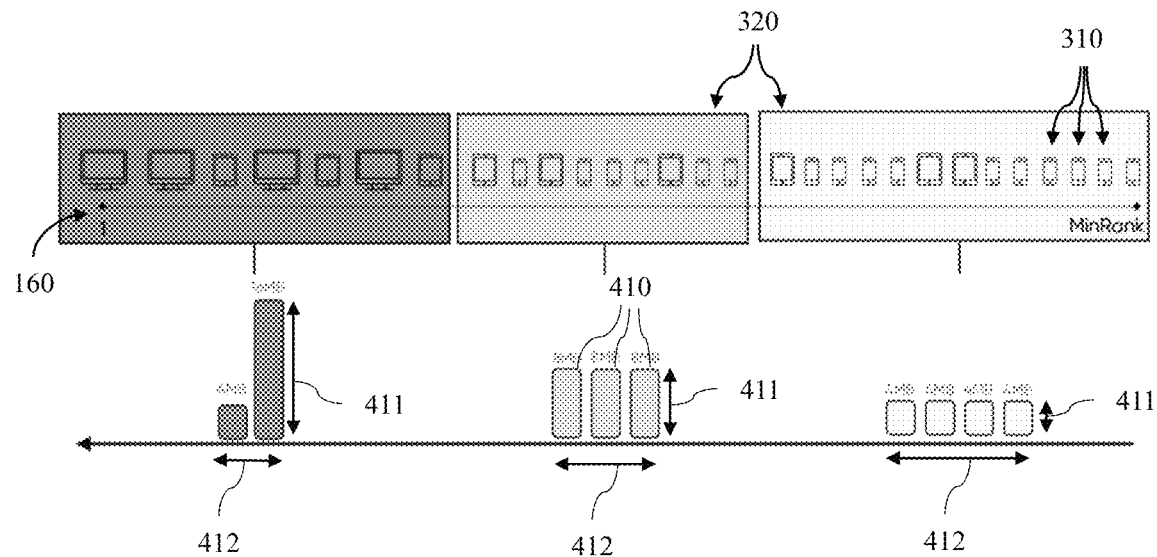
FIG. 6 is a schematic representation of attribution of cluster chunk sizes and cluster chunk numbers to the clusters, as parameters for splitting job data in input chunks, according to the method of FIGS. 2 and 3.

In FIG. 4, an example pre-election is shown, where the user devices are ordered by overall device score. A group of user devices 310, designated as a whole with number 311, is pre-elected based on a target range on the overall device score. Then, some devices of the group 311, indicated as 312, are discarded based on another criterion, such as a geographical restriction.

In the preferred embodiments, selecting the job partitioning scheme comprises grouping the user devices 310 in clusters 320. The cluster grouping preferably follows the pre-election of user devices 310 based on the target ranges, as described above. In other words, only the pre-elected user devices 310 are grouped in clusters 320. However, other embodiments can be envisaged where all the user devices 310 are eligible for cluster grouping, and no pre-election step is performed.

For the sake of cluster grouping, a number of clusters 320 is selected. This number can be a fixed number, or can be determined based on the job specifications and/or on the grid state.

Once the number of clusters 320 is selected, the user devices 310 are assigned to the clusters 320, preferably based on their device scores 150 and/or based on the grid indexes 160. Thus, assignment of the user devices 310 to different clusters 320 is ultimately based on their computing capacity and availability parameters.

In more detail, each cluster 320 is attributed a cluster score range, and user devices 310 are assigned to the cluster 320 if their computing capacity and availability parameters are compatible with the cluster score range. Similarly to the target ranges used for pre-election, the cluster score ranges can be ranges of values applied to the device scores 150 or to the device position in the grid indexes 160, to select which user devices 310 will be included in, or excluded from, the different clusters 320.

In the preferred embodiment, this assignment is based on the capacity score. In any case, as pre-election is based on the overall score, also the assignment to clusters 320 is based at least indirectly on the overall score, and so on any device score 150 that is used to determine the overall score.

After the step of cluster grouping, selecting the job partitioning scheme comprises selecting cluster chunk sizes 411 and attributing them to the different clusters 320. The cluster chunk sizes 411 are splitting parameters that are used to split the job data in the input chunks 410. In more detail, each cluster chunk size 411 represents a value of the size of the data that is intended to be included in input chunks 410 for a cluster 320.

When selecting the cluster chunk sizes 411, higher cluster chunk sizes 411 are preferably attributed to clusters 320 having cluster score ranges compatible with better computing capacity and availability parameters, and lower cluster chunk sizes 411 are attributed to clusters 320 having cluster score ranges compatible with worse computing capacity and availability parameters.

When selecting the cluster chunk sizes 411, preferably a minimum size is first selected, to be attributed to the cluster 320 having the lowermost cluster score range. Then, the cluster sizes 411 of the remaining clusters 320 are selected greater than, preferably as multiples of, the minimum size, according to respective expansion factors.

The minimum size can be so selected by a skilled person, as to balance the need to have small sizes, in order to expedite task execution by the user devices 310, and the need to have sizes that are not too small, to prevent multiplying the number of input chunks 410 and prevent raise of communication problems of the internal service system 130 with the grid.

The minimum size can be fixed, but it can also be customized, that is inputted by the customer entities 200 as part of the job specification.

In the preferred embodiments, selecting the job partitioning scheme further comprises assigning to the clusters 320 respective cluster chunk numbers 412, for example in the form of crowding factors representing the ratio of the cluster chunk number 412 to the number of user devices 310 of each cluster 320. As detailed below, the cluster chunk number 412 is a distribution parameter that is used in one or more steps during the process of assigning the tasks 420 to the user devices 310. In more detail, the cluster chunk number 412 represents a number of input chunks 410 that are intended to be assigned to each cluster 320.

The cluster chunk numbers 412 are selected based on the job specifications, and in particular on the job size, and preferably also on the priority level. Higher cluster chunk numbers 412 are assigned to all the clusters 320 for computational jobs 400 with higher job size, and lower cluster chunk numbers 412 are assigned to all the clusters 320 for computational jobs 400 with lower job size.

Moreover, higher cluster chunk numbers 412 are assigned to clusters 320 having better computing capacity and availability parameters, for computational jobs 400 with higher priority levels, and lower cluster chunk numbers 412 are assigned to clusters 320 having better computing capacity and availability parameters, for computational jobs 400 with lower priority levels. Conversely, lower cluster chunk numbers 412 are assigned to clusters 320 having worse computing capacity and availability parameters, for computational jobs 400 with higher priority levels, and higher cluster chunk numbers 412 are assigned to clusters 320 having worse computing capacity and availability parameters, for computational jobs 400 with lower priority levels.

Thus, the job data are split so as to generate, for each cluster 320, input chunks 410 in a number not exceeding, preferably equal to, its respective cluster chunk number 412, and with a size not exceeding, preferably equal to, its respective cluster chunk size 411, until the job size is reached. In some cases, the actual number and size can be smaller than the selected cluster chunk number 412 and cluster chunk size 411, due to real job size being different from the sum of the chunk sizes of all the expected chunks.

Preferably, the splitting of the job data includes a pre-splitting step, where the input stream is split in intermediate chunks, with a fixed size greater than the cluster chunk sizes 411 selected for all the input chunks 410. Then, in a final splitting step the intermediate chunks are split into the input chunks 410 to achieve the cluster chunk sizes 411 described above.

As the input chunks 410 are progressively created, by splitting the job data as described, the tasks 420 are generated from the input chunks 410. In some embodiments, only one task 420 is generated from each input chunk 410. Instead, in the preferred embodiment, selecting the job partitioning scheme comprises selecting one or more replication parameters, in particular a replication factor representing a ratio of the number of tasks 420 to the number of input chunks 410, though other similar or equivalent replication parameters can be selected as an alternative. One replication parameter can be selected for all the clusters 320, or different replication parameters can be selected for respective clusters 320.

The replication factor can be selected equal to one, meaning that only one task 420 is created for each input chunk 410, or greater than one, meaning that more than one task 420 will be created for at least some input chunks 410, namely an original task and one or more task replicas. For example, for a replication factor of two, one task replica is created for each input chunk 410. For a replication factor between one and two, a certain fraction of the input chunks 410 originate respective task replicas, and a complementary fraction of the input chunks 410 originate no task replica.

Higher replication factors will cause more identical tasks 410 to be executed for the same input chunk 410 by distinct user devices 310, as described below. Assignment of replicated tasks 410 to distinct user devices 310 may take place deterministically or stocastically. Accordingly, the risks of missing, incorrect or delayed delivery of the computational results are reduced. However, higher replication factors also increase the total computational power that is used to execute the computational job 400, so that a balanced replication factor can be selected by the skilled person based on the job specification and on the grid state.

In order for increasing the replication factor to two, without exhausting the maximum number of concurrent tasks 420 sent to a cluster 320, the crowding factor of each cluster 320 is preferably selected not higher than 0.5.

It is worthwhile noting that the distinction of an original task to a corresponding task replica may be purely lexical, while no hierarchical distinction may be inherent in suck tasks, having in general the same content but distinct identifiers.

Then, the preferred method of assigning the tasks 420 to the user devices 320 comprises pre-assigning cluster task groups to the clusters 320, in the form of cluster queues 421 stored in the queuing database 122. It is worthwhile noting that assignment of the tasks 420 to cluster queues 421 is performed progressively, while upload of the input stream is ongoing, as the input chunks 410 are progressively formed.

Each cluster task group comprises all the tasks 420 (both original ones and replicas) originating from the input chunks 410 having the cluster chunk size 411 attributed to the cluster 320.

Preferably, pre-assigning the cluster task groups to the clusters 310 is the last function that is performed by the partitioner service 132.

A subsequent step of assigning the tasks 420 to the user devices 310 is feeding the tasks 420 of each cluster queue 421 into individual device queues 422 of all the devices of the cluster. This is preferably performed by a feeder service 133 of the internal service system 130. Individual device queues 422 can be stored in a queuing database, which can be that same queuing database 122 storing the cluster queues 421, that is the first queuing database 122, of a distinct, second queuing database 123, as shown in FIG. 1.

In the preferred embodiment, feeding the tasks 420 in the device queues 422 comprises shuffling the tasks 420 of each cluster queue 421 with different orders for the different user devices 310 of the cluster 320. The different orders of the individual device queues 422 can be selected as random orders or with specific shuffling schemes that will make the orders different to each other. Thus, the tasks 420 are fed in the individual device queues 422 in the respective different orders.

The device queues 422 are sent by the internal service system 130 to the respective user devices 310, either including all the tasks 420 of the queue 422, or just a list of pointers or indicators referring to the tasks 420. The user-side software 140 comprises a task downloading service 142 for downloading the tasks 420 and/or its respective device queue 422.

Figure 7:
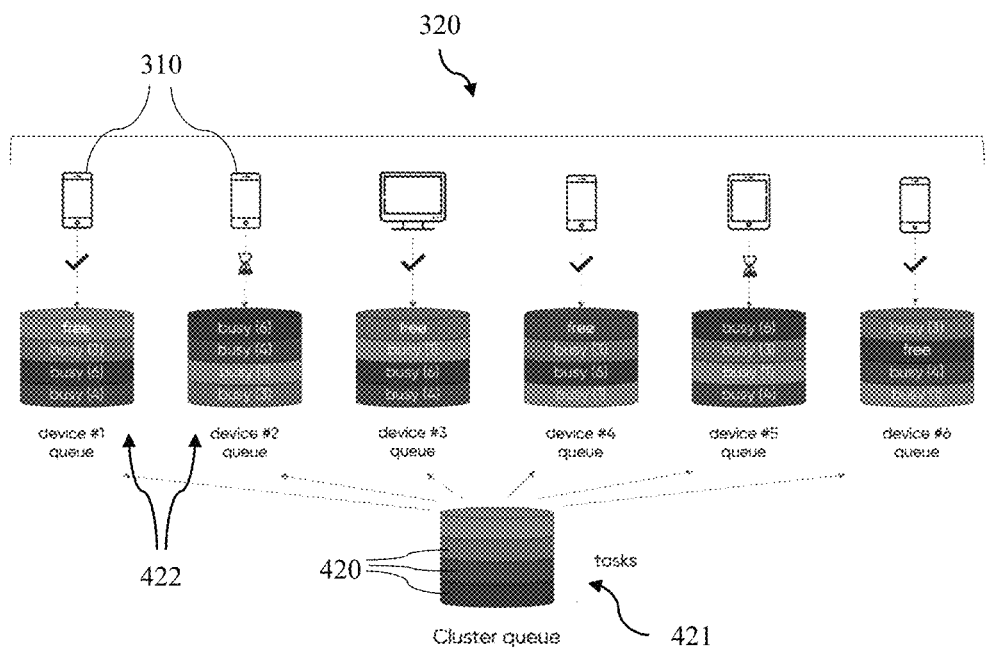
FIG. 7 is a schematic representation of generation of cluster task queues and individual device task queues, for assigning tasks to the user devices, according to the method of FIGS. 2 and 3.

The individual device queues 422 include task labels, indicating assignment statuses of each task. Assignment statuses include a status of not yet assigned ("free" in FIG. 7) and a status of already assigned ("busy" in FIG. 7). In some embodiments, also an assignment status of already assigned and completed can be envisaged.

At first, the labels indicate the not yet assigned status for all the tasks. Then, assigning the tasks 420 comprises selecting, by an available user device 310 of the cluster 320 running the user-side software 140, a specific task 420, from its individual device queue 422, that has not been so far assigned to another user device 310, and thus is labelled as not yet assigned. Preferably, the selected task 420 is the first task 420 in its device queue 422 that has not been selected so far by another user device 310. This will be different for many user devices 310 thanks to the shuffling step.

As a user device 310 selects a task 420, the user-side software 140 is configured to send an assignment signal to the internal service system 130. Then, the internal service system 130 is configured to confirm assignment of the selected specific task 420 to the user device 310. In particular, the internal service system 130 updates the label to an assignment status of already assigned for that specific task 420, in all the individual device queues 422 of the cluster 320. Accordingly, the task 420 is no more considered available, and will not be selected by other user devices 310 of the cluster 320.

The user-side software 140 is configured to receive any task 420 assigned to the user device 310, and to execute such tasks 420, by executing the executable file of the task 420 on the input chunk 410 of the task 420. Execution of the task 420 generates in the user device 310 an output chunk 430 of data. The user-side software 140 is configured to send the output chunk 430 back to the storage system 120. The user-side software 140 comprises an output chunk uploading service 143 for uploading the output chunks 430 in the storage system 120.

Accordingly, the storage system 120 receives several output chunks 430 from several user devices 310 for each computational job 400. The function of storing the output chunks 430 is preferably performed on a bucket database 124 of the storage system 120, that is preferably a cloud database. In one embodiment, the bucket database 124 is configured to temporarily create a virtual bucket for storing each output chunk 430. Thus, the bucket database 124 may behave like a web-based folder with access restrictions.

Figure 3:
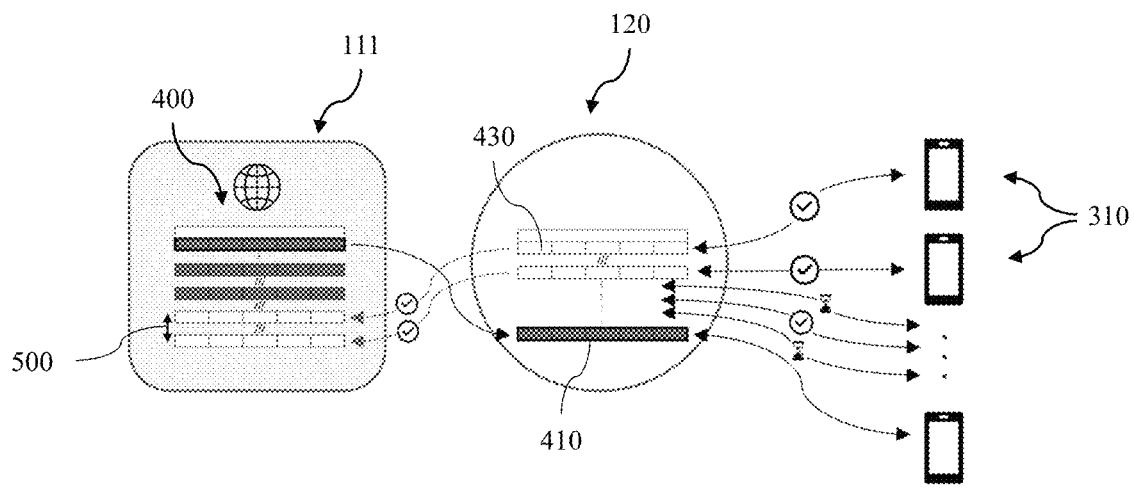

It is worthwhile noting that generation of some tasks 420, delivery of these tasks 420 to the user devices 310, and receipt of some output chunks 430 may begin during the upload time interval, and go on progressively in a similar manner as described for splitting the input stream. This is schematically shown in FIG. 3, where a check symbol represents the occurred receipt of output chunks 430 from some user devices 310, and an hourglass symbol represents waiting receipt of output chunks 430 from other user devices 310.

In case of no replication (or replication factor equal to 1), output chunks 430 will be generally different to each other, as the tasks 420 that are originated from a computational job 400 are generally different. Instead, with higher replication factors, the output chunks 430 originated from each task replica are expected to be equal to the output chunks 430 originated from the corresponding original tasks, unless execution of a task 420 involves a stochastic process.

However, this may not apply in case of corrupted output chunks 430, where data corruption occurred during transmittal to the user device 310 of the task 420, execution of the task 420, or transmittal to the storage system 120 of the output chunk 430.

In case of deterministic tasks 420 for which at least one task replica was generated, and thus for which plural output chunks 430 were received, the internal service system 130 is preferably configured to check integrity of the output chunk 430 by comparing the output chunks 430 originated from the same input chunk 410. In some embodiments, for two tasks 420 originating from the same input chunk 430, only one output chunk 430 need be sent by a user device 310 in the storage system 120, while another user device 310 may just send to the storage system 120 an hash generated from the output chunk 430, to allow check of the received output chunk 430 without sending its own full output chunk 430.

This function is preferably performed by a validator service 134 of the internal service system 130. In case a mismatch is found, the internal service system 130 is preferably configured to generate a further task replica for the input chunk 410 from which corrupted results were received. This further replica may be sent to and executed by a further user device 310, in order to produce a further output chunk 430 for the same input chunk 410, to perform a further comparison on the output chunks 430, and identify the intact and corrupted output chunks 430.

In a similar manner, the further replica may be directly executed by the validator service 134.

Even in absence of task replicas, the internal service system 130, in particular the validator service 134, is preferably configured to check integrity of the output chunks 430 by comparing chunk parameters, such as output chunk sizes and formats, with expected corresponding parameters. In case chunk corruption emerges from this check, similar corrective actions can be taken as described above, for the case of output chunk mismatch.

Additionally, the internal service system 130, in particular the validator service 134, is configured to verify timely arrival of the output chunks 430, that is arrival before a predetermined maximum time.

Preferably, for replicated tasks 420, verifying timely arrival of the output chunks 430 comprises verifying that at least one output chunk 430 has arrived for each input chunk 410. In other words, even in case only one output chunk 430 has been timely received, despite more than one tasks 420 were originated from the input chunk 410, receipt of any further output chunk 430 for any identical task 420 is not waited beyond the predetermined maximum time, and overall timely arrival for that input chunk 410 is confirmed.

This highly reduces delays in delivering the full job result 500 as much as the replication factor is high, as any missing or delayed delivery of an output chunk 430 may be compensated by timely arrival of another output chunk 430 originated from the same input chunk 410. The risk of simultaneous missing or delayed chunk delivery for plural user devices 310 is low. Nevertheless, missing replication of output chunks 430 may reduce the possibility of integrity checks.

Replication may also be dynamically increased during progress of processing of the computational job 400. In fact, the last output chunks 430 being received are the most likely to be already affected by a delay. Therefore, introducing more replicas while processing is almost complete, such as after receipt of a threshold percentage of the output chunks 430 (decided as a part of the partitioning scheme), increases efficiency right for the tasks 420 for which this is most needed.

Timely arrival may not occur in case of delayed arrival, but also in case of failure in transmittal to the user device 310 of the task 420, execution of the task 420, or transmittal to the storage system 120 of the output chunk 430.

Preferably, for at least some kinds of failure during execution of a task 420, the user-side software 140 is configured to send a failure signal to the internal service system 130. Otherwise, for other kinds of failure, for example in case of the user device 310 being turned to power-off, the internal service system 130 will just receive no reply from the user device 310 that received the task 420.

In more detail, verification of timely arrival of an output chunk 430 from a specific user device 310 may involve multiple steps and multiple cases. In a first case, lack of timely arrival is determined when a failure signal is received from the user device 310. In another case, lack of timely arrival is determined when no status answer is received from the user device 310 in reply to a heartbeat status query that follows delivery of the input chunk 410 to the user device 310. In this case, preferably lack of timely arrival is only confirmed if no reply from the user device 310 is received also after a certain time from a confirmation query of the internal system to the user device 310. In still another case, lack of timely arrival is determined when no output chunk 430 is received until expiry of the predetermined maximum time.

The internal service system 130, in particular the validator service 134, is configured to take mitigating actions in case no output chunk 430 has been received for a specific input chunk 410 within the predetermined maximum time (including all the cases described above). The mitigating actions are similar to those described for the case of corrupted results. In particular, they comprise re-assigning the task 420 related to the specific input chunk 410, or a copy thereof, to another user device 310 or for execution by the validator service 134 itself. Preferably, the delayed or failed input chunk 410 is re-assigned on the validator service 134, so that no further risk is incurred and the overall performance of the computational job 400 is not impaired, but the decision is always subject to the current capacity of the storage system 130.

As one or more output chunks 430 have been received for each and every input chunk 410 originating from a computational job 400, the internal service system 130 is configured to assemble these output chunks 430 thereby obtaining the job result 500. Part of an assembled job result 500 is shown in FIG. 3. This function is preferably performed by an assembler service 135 of the internal service system 130.

Finally, the customer-side software 110 is configured to output to the customer entities 200 the assembled job results 500, preferably by enabling download of the job results 500 through the customer platform 111. In more detail, the customer-side software 110 comprises a result downloading service 113 for downloading the job result 500 and/or one or more output chunks 430.

Though the main components and services that process the computational job 400 have been described, additional components and services are preferably provided as described below.

Preferably, the internal service system 130 comprises a rewarding service 136 configured to apply the predetermined pricing scheme in order to bill the customer entities 200 for computation of the computational job 400, and to credit the user entities 300 for executing the assigned tasks 420.

In more detail, the rewarding service 136 is configured to register billing and crediting values in a consistency database 125 of the storage system 120, that is preferably a structured query language (SQL) database configured to support informatic atomic transactions.

Moreover, the customer-side software 110 comprises a billing service 114 configured for downloading the billing values from the storage system 120, for outputting through the customer platform 111.

Furthermore, the user-side software 140 comprises a crediting service 144 configured for downloading and outputting on the user device 320 the crediting values from the storage system 120.

Preferably, the internal service system 130 comprises a transitioner service 137, configured to perform atomic transactions on the consistency database 125. The performed atomic transactions include changes of variables that must happen simultaneously for all the services of the internal service system 120. In particular, preferred examples of such changes of variables comprise changes in the grid state, changes in the assignment status of the tasks 420, changes in the status of computational jobs 400, and changes in the status of customer platforms 111.

The invention claimed is:

1. A method for distributed computing of computational jobs composed of job data, comprising:
providing a data storage system comprising one or more databases,
setting up a grid of user devices from user entities, the user devices being remote from the storage system and at least periodically in signal communication with the storage system, each user device having a predetermined computing capacity,
periodically querying each user device about a respective device status, the device status comprising computing capacity and availability parameters, wherein querying comprises requesting each user device to generate and send to the storage system a status answer, the status answer including the device status of the user device, defining a grid status as a function of status answers that were successfully sent by the user devices and received in the storage system, providing customer entities with an informatic customer platform, receiving job specifications, uploaded in the storage system through the customer platform by the customer entities, each job specification including parameters characterizing a respective computational job, selecting for each computational job a respective job partitioning scheme as a function of the grid status and of the job specification, receiving input streams of data, wherein each input stream is received for a respective computational job after receipt of the job specification of the computational job, includes the job data of the computational job, and is uploaded through the customer platform by a customer entity, splitting the job data included in each input stream in input chunks of data, according to splitting parameters of the partitioning scheme selected for the computational job, generating one or more tasks for each input chunk, each task including the respective input chunk and executable instructions to execute computations on the respective input chunk, wherein the job partitioning scheme selected for each computational job comprises one or more replication parameters, and generating the tasks comprises generating plural replicated tasks for at least some input chunks, such that the tasks are more than the input chunks according to the one or more replication parameters, assigning and sending each task to one or more respective user devices, that are selected based on distribution parameters of the partitioning scheme selected for the respective computational job, wherein replicated tasks generated for a common input chunk are assigned to distinct user devices, receiving in the storage system output chunks of data from the user devices, each output chunk being obtained by a user device by executing a task, verifying that at least one output chunk has timely arrived for each input chunk, outputting to the customer entities job results through the customer platform, each job result including data obtained by assembling the output chunks related to the corresponding computational job.

2. The method of claim 1, wherein:

for each computational job, receiving the input stream of the computational job takes an upload time interval, the steps of splitting the job data, generating the tasks and sending the tasks to the user devices begin during the upload time interval, each input chunk is temporarily stored in the storage system, from a respective save instant, in which the input chunk is saved in the storage system, to a respective delete instant, in which the input chunk is deleted from the storage system, the save instant of each input chunk occurs during the upload time interval of the respective computational job, for at least one input chunk, the delete instant occurs during the upload time interval of the respective computational job.

3. The method of claim 1, wherein:

the distribution parameters of the partitioning scheme include one or more target ranges for respective computing capacity and availability parameters or combinations thereof, the target ranges being determined as a function of the job specifications, the partitioning scheme provides, for the purpose of assigning tasks of a computational job to user devices, to discard incompatible user devices, having device status with computing capacity and availability parameters that are incompatible with the one or more target ranges, and to at least pre-elect the remaining compatible user devices, having device status with computing capacity and availability parameters that are compatible with the one or more target ranges.

4. The method of claim 1, wherein:

selecting the job partitioning scheme comprises grouping the user devices in clusters, each cluster comprising user devices that are selected based on values of their computing capacity and availability parameters, assigning the tasks to the user devices comprises:

pre-assigning cluster task groups to distinct clusters, of the cluster task groups being arranged as cluster queues, for each cluster, feeding all the tasks of the cluster queue of the computational job_into the individual device queue of each user device of the cluster, preferably wherein each individual device queue include task labels, indicating assignment statuses of each task as being already assigned or not yet assigned, selecting by an available user device of the cluster a specific task, from the individual device queue of the user device, that has not been so far assigned to another user device, and confirming assignment of the selected specific task to said available user device.

5. The method of claim 4, wherein:

feeding the tasks of the cluster queues into the device queues comprises shuffling the tasks of each cluster queue with different orders, preferably random orders, for the different user devices of the cluster, and feeding the tasks in the individual device queues in the respective different orders, selecting the specific task by the available user device comprises selecting the first task in the device queue of the user device that has not been assigned so far to another user device.

6. The method of claim 4, wherein:

selecting the job partitioning scheme comprises assigning to the clusters, as a splitting parameter, respective different cluster chunk sizes, and as a distribution parameter, respective cluster chunk numbers, based on the job specifications, preferably wherein higher cluster chunk sizes are assigned to clusters having higher values of computing capacity and availability parameters, and lower cluster chunk sizes are assigned to clusters having lower values of computing capacity and availability parameters, splitting the job data generates for each cluster, and feeds into the cluster queue of the cluster, and inputting chunks in a number not exceeding a cluster chunk number of the cluster, preferably the number equals to the cluster chunk number of the cluster, and with a size not exceeding a cluster chunk size of the cluster, preferably the size equals to the cluster chunk size of the cluster.

7. The method of claim 1, wherein, after verifying timely arrival of the output chunks, in case no output chunk has been received for a specific input chunk within a predetermined maximum time, the method comprises re-assigning the task related to the specific input chunk to another user device or to a software validator service running on the storage system, the validator service being configured in this case to obtain an output chunk by executing the task.

8. The method of claim 1, wherein:
   defining the grid status comprises processing the computing capacity and availability parameters of each device status to obtain for each user device one or more device scores,
   defining the grid status comprises ordering the user devices in one or more grid indexes based on respective device scores, and
   said distribution parameters of the job partitioning scheme are set to assign the tasks to the user devices based on the device positions in said one or more grid indexes.

9. The method of claim 1, wherein the computing capacity and availability parameters of each device status comprise one or more of:
   power on/off, availability time window, current activity of the user device, remaining battery, core temperature, user device location and/or accelerometer data,
   values of installed, available and/or usage threshold for RAM, CPU, storage and/or bandwidth,
   network type, speed, latency and/or IP address,
   performance on a recent test tasks or on a recent task generated from an input chunk.

10. Electronic system for distributed computing of computational jobs by the method of claim 1, comprising:
   a customer data processing system including a memory and a processor configured to execute a customer-side software including said customer platform, with algorithms for inputting said job specifications, inputting said input streams of data, and outputting said job results,
   said data storage system including a memory and a processor configured to execute a software internal service system, with algorithms for querying the user devices about the device status, receiving said status answers and defining said grid status, selecting said job partitioning schemes, splitting said job data, generating said tasks, assigning and sending the tasks to the user devices, receiving said output chunks from the user devices, verifying timely arrival of the output chunks, and assembling the output chunks in said job results,
   said user device, each user device including a memory and a processor configured to execute a user-side software, with algorithms for assessing the computing capacity and availability parameters of a user device, generating and sending said status answers, receiving the tasks assigned to the user device, executing the tasks to generate said output chunks, and sending the output chunks to the storage system.

* * * * *